May 11, 1954
R. TETZLAFF
2,677,866
HOSE CLAMP CONSTRUCTION
Filed June 13, 1952
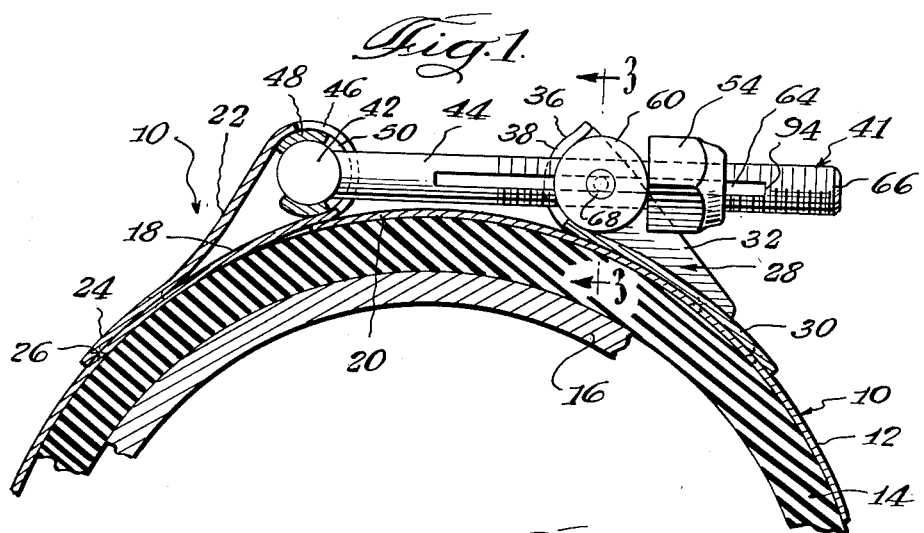
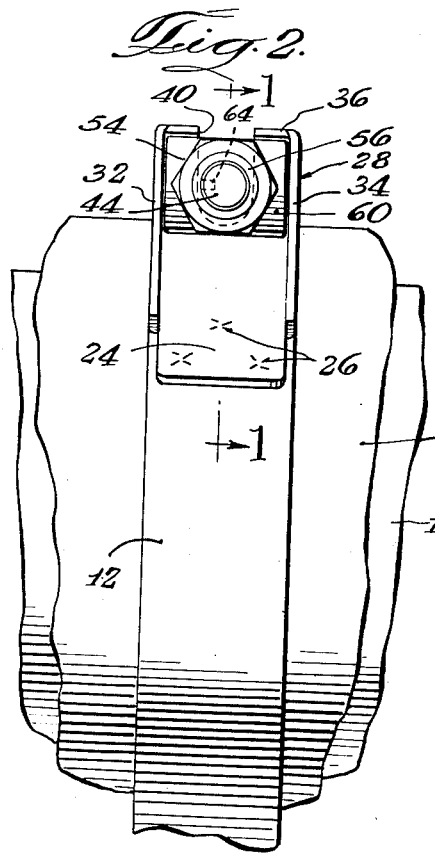
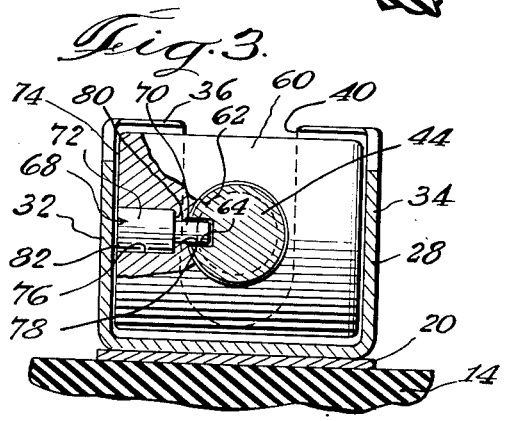
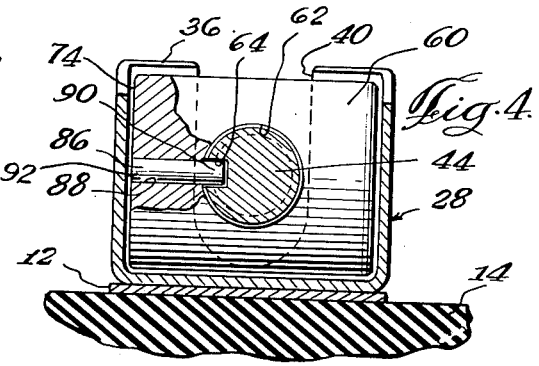
Inventor
Ralph Tetzlaff
By Jo Irving Silverman
Attorney Patented May 11, 1954

2,677,866

UNITED STATES PATENT OFFICE 2,677,866

HOSE CLAMP CONSTRUCTION

Ralph Tetzlaff, La Grange, Ill.

Application June 13, 1952, Serial No. 293,385

7 Claims. (Cl. 24—279)

This invention relates to hose clamps adapted for coupling hoses in telescopic relation to conduits and more particularly is concerned with a hose clamp of the character described having novel means for effecting rapid and efficient consecutive release and tightening thereof. In addition, the invention provides improvements in the hose clamp described in co-pending application entitled Rapid Release Hose Clamp, Serial No. 247,399, filed September 20, 1951, by Bertel Stade.

In the said co-pending application, there was described a hose clamp having a novel socket-like fitting which permitted the tightening means to be pivoted out of engagement with the clamp so that the clamp could be released easily and rapidly without necessitating complete dis-assembly of the tightening means. The tightening means carried between the looped end of the clamp band and the fitting included a pair of connector members and a threaded bolt, one connector being slidable and rotatable on the said bolt and adapted to be received in the said fitting and the other being retained in the loop and being screw-threaded to act as a nut for the bolt. The fitting thus provided permitted the withdrawal of the bolt and said one connector therefrom thereby eliminating the necessity of disengaging the bolt from any of the connector members.

However, after the bolt and the said one connector were pivoted out of engagement with the fitting, said connector would slide and rotate on the threaded bolt in an uncontrolled manner. In order to tighten the clamp again, it was necessary first to align the connector member in proper position for being received in the fitting and thereafter carefully insert same into the fitting. This operation often was time consuming where it was desired to re-assemble the hose connection in a minimum of time.

In the hose clamp of the said co-pending application, in the event the seating connector, i. e. the one not engaged in the loop, is unseated, the head of the bolt prevents loss of the said connector, which of course is free on the bolt. Other types of hose clamps, however, may have the bolt head permanently engaged in the loop, and depend upon a nut to tighten the clamp. When the nut is removed to replace same which is frequent where fibre center lock nuts are used, the free connector is easily dropped off or lost. Even in the case of the type of hose clamps shown in the said co-pending application, if the entire bolt is removed from the hose clamp, the free connector can drop off.

Accordingly, it is a primary object of the invention to provide a hose clamp of the character described in which the release and tightening means remain in constant proper alignment during consecutive release and tightening of the clamp.

Another object of the invention is to provide a hose clamp of the character described in which the tightening means include a threaded screw member or bolt and connector which are permanently in proper alignment one relative to the other whereby to effect rapid and efficient release and tightening of the clamp.

Still another object of the invention is to provide tightening means for a hose clamp of the character described in which the connector member slidable on the threaded screw member is permanently and slidably mounted thereon for movement only parallel with the axis thereof; in which said screw member or bolt is provided with a guideway, said connector member having means engageable with said guideway for preventing rotary movement of the connector, yet permitting said sliding movement therealong.

A further object of the invention is to provide a structure of the character described in which the slidable connector member is secured on the bolt against accidental loss.

Other objects of the invention lie in the economical and simple nature of the construction constituting the herein invention, the ease and simplicity with which same may be manufactured and the durability and strength thereof.

The foregoing and other objects of the invention will become apparent as the disclosure proceeds, in connection with which preferred embodiments of the invention have been illustrated in the accompanying drawings, which when considered in connection with the following description, this invention, its mode of construction and assembly and many of its advantages will be readily apparent and appreciated. It should be understood that minor changes in form, proportion, size and relationship of parts may be made without departing from the scope of the invention or sacrificing any of its advantages.

Referring to the drawings in which the same characters of reference are employed to indicate corresponding or similar parts throughout the several figures of the drawings:

Fig. 1 is a sectional view taken through a hose connection having the clamp embodying the invention mounted thereon, same being taken along the line 1—1 of Fig. 2 and in the direction indicated.

Fig. 2 is an end-on view of the clamp.

Fig. 3 is a sectional view taken through the tightening means of the clamp along the line 3—3 of Fig. 1 and in the direction indicated.

Fig. 4 is a sectional view similar to Fig. 3 taken through a modified form of the tightening means of the clamp.

Referring now to the drawings, the reference character 10 designates generally the hose clamp embodying the invention. Same comprises a circular clamp band 12 which may be made from flexible metallic strip and which is adapted to be mounted around a hose 14 telescopically engaged over the end of a conduit 16. The band 12 is split at one point along its circumference to provide end portions 18 and 20. The end portion 18 is bent upon itself to form a loop 22 and the end 24 thereof is attached to the band by means such as spot welds indicated at 26. The second end has a fitting 28 welded thereto designed to permit the rapid release of the said clamp.

Said fitting 28 is similar to that described in the said co-pending application. Same comprises an integral member preferably made from metal secured atop the clamp band at the end 20. There is a planar portion forming the bottom wall 30, the side edges of which are extended perpendicular thereto to form a pair of spaced, vertically disposed side walls 32 and 34. The side walls 32, 34 are joined by means of a front wall 36 integrally formed therewith and extending vertically from the wall 30. Said side walls are spaced apart a distance sufficient to receive therein a connector member of the character to be described and the front wall 36 is provided with a transverse groove 38 open at its top 40 which is adapted to receive therethrough the threaded screw or bolt 41 of the tightening means. The rear of the fitting 28 is open so that the construction of the fitting constitutes same in effect a dish-shaped socket member.

The tightening means is spanned between the loop 22 and the fitting 28 in such a manner that manipulation thereof will draw said loop and fitting toward each other for tightening the clamp on the hose connection. The tightening means comprise a T-bolt 41 having its head 42 disposed in the loop 22 and its long leg 44 which constitutes the shank of the T-bolt extending through a transverse slot 46 in said loop 22, through groove 38 in the fitting 28 and through the open rear portion thereof. I provide a C-shaped bushing 48 also preferably made from metal which is adapted to be secured in the loop 22 around the head 42 serving as a shim or spacer for the head 42 so as to prevent longitudinal movement of said T-bolt in the loop. Said bushing has a transverse opening 50 through which the shank 44 is passed, it being noted that the opening 50, slot 46 and groove 38 are aligned one with the other. The manner of assembling the head 42, and bushing 48 in the loop 22 is well known.

The shank 44 is threaded along a major portion thereof and has a threaded nut 54 engaged thereon. The nut 54 preferably is of hexagonal shape to permit same to be engaged by a suitable wrench for tightening same and usually will have a fibre core 56 for locking same on the bolt 41. Slidably mounted on said shank 44 is a connector member 60 which is cylindrical in formation and is provided with a passageway 62 through which the shank 44 passes. The passageway 62 is arranged perpendicular to the cylindrical axis of the said member. The member 60 is adapted to be seated in said fitting 28 disposed between the side walls 32 and 34.

In the construction described in said co-pending application, the equivalent connector member was both slidable and rotatable on the shank portion of its threaded screw member. Thus, when the shank 44 and member 60 were pivoted out of engagement with the fitting 28, the member 60 would rotate uncontrollably and become misaligned with the fitting 28. In order to tighten the clamp again, it was first necessary to align the member 60 with the fitting 28 so that it would fit between the side walls 32 and 34. Also, in the event the shank 44 was removed from the second connector member shown in said co-pending application, the member 60 was apt to fall off the shank and become lost. By means of the construction hereinafter described, these disadvantages are eliminated.

In connection with the above, attention is directed to the gasket or core 56 in nut 54. After long use, it becomes necessary to replace the nut since the gasket 56 wears out. When the nut is removed from shank 44, the connector 60 is likely to slide off the shank and become lost. This eventuality is eliminated by my invention.

The shank 44 is provided with an elongate, longitudinally extending groove or guideway 64 intermediate the end 66 of the T-bolt and the leg 42. Said guideway 64 may be relatively shallow. Referring to Fig. 3, the connector member 60 is provided with a pin 68 which has a portion 70 protruding into the passageway 62. Thus, when the member 60 is mounted on the shank 44, the portion 70 is disposed in the guideway 64 and is adapted to ride therealong when the member is slided along the shank.

One manner of constructing said pin 68 is shown in Fig. 3. In said Fig. 3, the pin 68 is formed preferably of metal and includes an enlarged annular portion 72 and the portion 70 integrally formed therewith which is of a reduced diameter. The pin 68 is adapted to be force-fitted into a suitable hole bored in the member 60 co-axially therewith, said hole or passageway including a portion 76 of enlarged bore corresponding to the diameter of the portion 72 and a smaller bore portion 78 corresponding to size of the portion 70. The shoulders 80 thereby formed serve as stop means for preventing the portion 70 from extending too far into the passageway 62. After the pin 68 is inserted in the said opening, the end 82 may be ground down flush with the edge of side wall 74. With the portion 70 disposed in the guideway 64, the member 60 will be seen to be mounted on the shank 44 with its cylindrical axis perpendicular to the longitudinal axis of the shank and the pin 68 will prevent rotation of member 60 on said shank. In this manner, the member 60 always will remain in proper alignment for being disposed in the fitting 28 for tightening the clamp.

In Fig. 4 I have shown a modified embodiment of the tightening means heretofore described. There is shown the connector member 60 disposed in the fitting 28 with the shank 44 passing therethrough. Said shank is provided with a guideway 64 and the member 60 has a pin 86 which protrudes into the passageway 62. In this modification, the pin 86 is of uniform diameter inserted into a passageway 88 in member 60 and having a portion 90 thereof which enters said guideway 64. The end 92 of said pin is flush with the side 74. The member 60 slides along the guideway 64 as described in connection with the embodiment of Fig. 3.

The end of the guide slot 64 terminates short of the end of the T-bolt 41 as indicated at 94 and hence, once assembled to the bolt, the connector member 60 is not capable of being removed therefrom without damage.

It is believed unnecessary to describe in detail the operation of said clamp 10 since the manner of tightening and releasing same will be apparent to artisans skilled in the art to which same appertains. It will be seen however that I have provided a novel clamp construction in which the tightening means always remain in proper alignment, in which rapid and efficient release and tightening of the clamp can be effected and in which the parts of the tightening means cannot be lost when the clamp is dis-assembled. It is believed that the mode of construction and assembly of the hose clamp embodying the herein invention is readily understood from the foregoing and although specific details thereof are capable of wide variations within the purview of the invention, it is intended that the invention be construed in accordance with the claims hereto appended.

I claim:

1. A hose clamp of the character described comprising a flexible metallic band having free end portions, a loop on one end portion, a fitting on the second end portion, a tightening bolt having one end pivotally retained in said loop and having a connector member thereon spaced from said pivot and adapted to be positioned in said fitting, said fitting permitting the bolt and connector member to be pivoted about the loop out of engagement therewith for rapid release of the clamp, said bolt and connector having a slot and pin connection permitting only sliding movement of said connector on said bolt, said bolt having the slot extending longitudinally therein of constant depth along the extent thereof, said connector member having a passageway therethrough slidably receiving the bolt therein, said connection including a pin in said connector extending into said passageway and slidably received in said slot.

2. A hose clamp of the character described comprising a flexible metallic band having free end portions, a loop on one end portion, a fitting on the second end portion, a tightening bolt having one end pivotally retained in said loop and having a connector member thereon spaced from said pivot and adapted to be positioned in said fitting, said fitting permitting the bolt and connector member to be pivoted about the loop out of engagement therewith for rapid release of the clamp, said bolt and connector having a slot and pin connection permitting only sliding movement of said connector on said bolt, said bolt having the slot extending longitudinally therein, said connector member having a passageway therethrough slidably receiving the bolt therein, said connection including a pin in said connector extending into said passageway and slidably received in said slot, said connector member having a pin-receiving passageway extending through the same substantially perpendicularly to the axis of said bolt, and said pin being disposed in said pin-receiving passageway the bottom surface of said slot being parallel to the longitudinal axis of said bolt.

3. A hose clamp of the character described comprising a flexible metallic band having free end portions, a loop on one end portion, a fitting on the second end portion, a tightening bolt having one end pivotally retained in said loop and having a connector member thereon spaced from said pivot and adapted to be positioned in said fitting, said fitting permitting the bolt and connector member to be pivoted about the loop out of engagement therewith for rapid release of the clamp, said bolt and connector having a slot and pin connection permitting only sliding movement of said connector on said bolt, said bolt having the slot extending longitudinally therein, said connector member having a passageway therethrough slidably receiving the bolt therein, said connection including a pin in said connector extending into said passageway and slidably received in said slot, said connector member having a pin-receiving passageway extending through the same substantially perpendicularly to the axis of said bolt, and said pin being disposed in said pin-receiving passageway, the pin having a reduced diameter portion which extends into said first-mentioned passageway and the pin-receiving passageway having a reduced diameter bore portion cooperating therewith to fix the position of the said pin-receiving passageway.

4. A clamp of the character described comprising a circular band of flexible metal having a pair of free end portions, a loop on one end, a socket-like fitting on the other end, a T-bolt having its transverse leg pivotally retained in said loop, a connector member on said bolt spaced from said pivot and adapted to be engaged in said socket, said fitting permitting the bolt and connector member to be pivoted out of engagement therewith for releasing said clamp, said bolt being threaded along at least a portion thereof and having a longitudinally extending guideway formed thereon, said connector having means adapted to be received in said guideway when the connector member is mounted on the bolt, said means and guideway permitting sliding movement of the connector member along said bolt and maintaining the said member in proper alignment relative to said fitting when the bolt and member are pivoted as described, said guideway being substantially parallel to the axis of said bolt and terminating short of the bolt ends, whereby said connector member is substantially permanently associated with said bolt.

5. A clamp of the character described comprising a circular band of flexible metal having a pair of free end portions, a loop on one end, a socket-like fitting on the other end, a T-bolt having its transverse leg pivotally retained in said loop, a connector member on said bolt spaced from said pivot and adapted to be engaged in said socket, said fitting permitting the bolt and connector member to be pivoted out of engagement therewith for releasing said clamp, said bolt being threaded along at least a portion thereof and having a longitudinally extending guideway formed thereon, said connector having means adapted to be received in said guideway when the connector member is mounted on the bolt, said means and guideway permitting sliding movement of the connector member along said bolt and maintaining the said member in proper alignment relative to said fitting when the bolt and member are pivoted as described, said connector having a passageway therethrough for receiving said bolt, said means comprising a pin mounted in said member having a portion thereof extending into said passageway, said portion adapted to be received in said guideway when the bolt and connector member are assembled, said connector having a pin-receiving opening therein extending between a side thereof and said passageway, said pin being fixedly secured in said opening.

6. A clamp of the character described comprising a circular band of flexible metal having a pair of free end portions, a loop on one end, a socket-like fitting on the other end, a T-bolt having its transverse leg pivotally retained in said loop, a connector member on said bolt spaced from said pivot and adapted to be engaged in said socket, said fitting permitting the bolt and connector member to be pivoted out of engagement therewith for releasing said clamp, said bolt being threaded along at least a portion thereof and having a longitudinally extending guideway formed thereon, said connector having means adapted to be received in said guideway when the connector member is mounted on the bolt, said means and guideway permitting sliding movement of the connector member along said bolt and maintaining the said member in proper alignment relative to said fitting when the bolt and member are pivoted as described, said connector having a passageway therethrough for receiving said bolt, said means comprising a pin mounted in said member having a portion thereof extending into said passageway, said portion adapted to be received in said guideway when the bolt and connector member are assembled, said connector having an opening therein communicating between a side of the connector and said passageway, said opening including a portion of reduced size, said pin having shoulders thereon adapted to engage against said reduced portion when the pin is secured therein whereby to position said pin with its said portion in proper alignment with said guideway.

7. A clamp of the character described comprising a circular band of flexible metal having a pair of free end portions, a loop on one end, a socket-like fitting on the other end, a T-bolt having its transverse leg pivotally retained in said loop, a connector member on said bolt spaced from said pivot and adapted removably to be received in said fitting, said bolt being threaded along at least a portion thereof and having a longitudinally extending guideway formed therein, having the bottom surface thereof substantially parallel to the axis of said bolt, said connector having means adapted to be received in said guideway when the connector is mounted on the bolt whereby to permit sliding movement of the connector along said bolt and maintain the connector member in proper alignment relative to said fitting when the bolt and member are pivoted, said connector having a passageway therethrough for receiving said bolt, said means comprising a pin mounted in said member having a portion thereof extending into said passageway, and adapted to be received in said guideway when the bolt and connector member are assembled, said guideway terminating intermediate the extremities of said bolt whereby to provide a wall at each end of said guideway preventing said portion from sliding out of the guideway.

References Cited in the file of this patent

UNITED STATES PATENTS

| Number | Name | Date |
|---|---|---|
| 652,794 | Lowe | July 3, 1900 |
| 1,445,568 | Terheide | Feb. 13, 1923 |
| 1,514,412 | Wilkinson | Nov. 4, 1924 |
| 2,363,206 | Sprouse | Nov. 21, 1944 |

FOREIGN PATENTS

| Number | Country | Date |
|---|---|---|
| 131,177 | Great Britain | Aug. 21, 1919 |